Patented Mar. 24, 1953

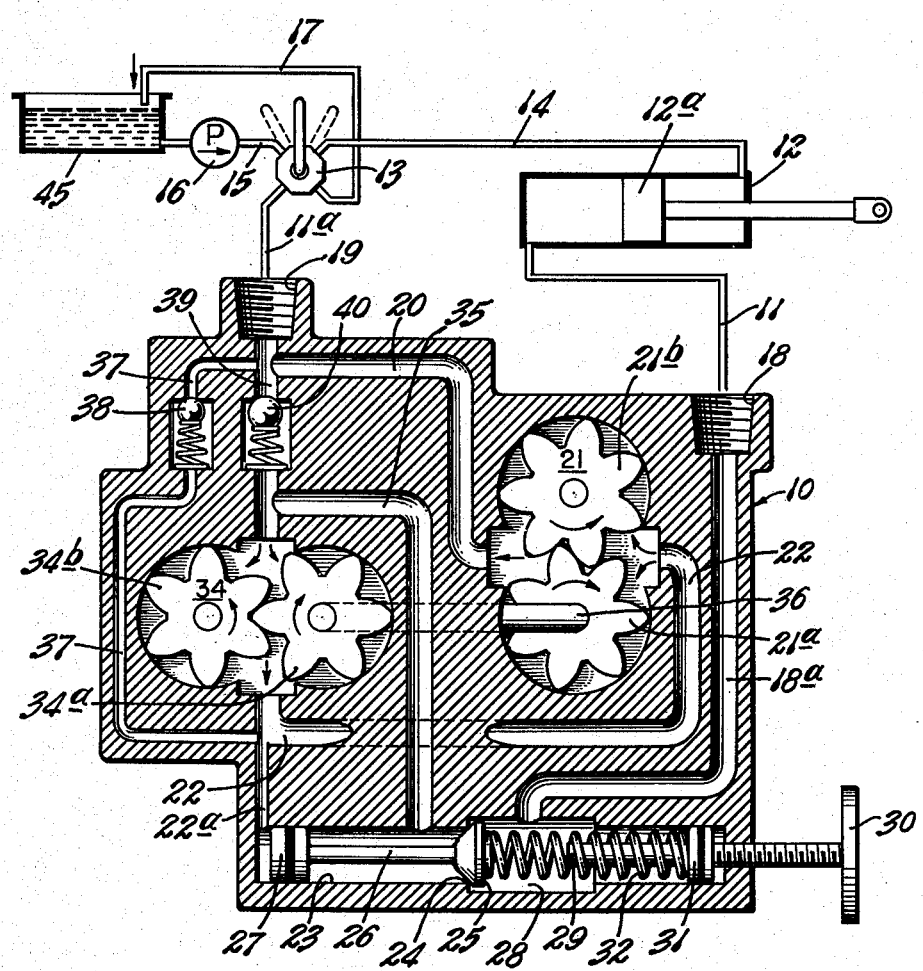

2,632,472

UNITED STATES PATENT OFFICE 2,632,472

FLUID METERING VALVE HAVING DIFFERENTIAL HYDRAULIC MECHANISM

Carlos B. Livers, North Hollywood, Calif., assignor to Bendix Aviation Corporation, South Bend, Ind., a corporation of Delaware Application February 13, 1951, Serial No. 210,668

3 Claims. (Cl. 137—643)

1

This invention relates to shut-off valves for hydraulic motors for automatically stopping such motors when they have been actuated through a predetermined distance, and particularly to valves for such purposes that respond directly to the quantity of fluid flowing through the motor as distinct from those that are mechanically actuated by the motor.

There is disclosed in patent application Serial No. 186,664, filed September 25, 1950, a fluid-metering shut-off valve in which a valve is moved from open to closed position at a rate proportional to the rate of fluid flow through the valve, by passing the fluid through a motor of relatively large displacement, and causing the motor to drive a pump of small displacement which supplies fluid to a small valve motor that closes the valve.

An object of the present invention is to simplify, reduce the cost, and increase the accuracy of metering valves of the type disclosed in the prior application.

Other more specific objects and features of the invention will appear from the description to follow.

The present invention represents a further development of the invention disclosed in the mentioned prior application, in that the motor and pump have only slightly different displacements, and the differential displacement of the two is utilized to close the valve. This provides sensitivity with a more practicable structure, in that it is easier to construct two motor or pump units of comparable small size, than to construct two such units of radically different sizes, as is necessary if the displacement of a motor is to be much greater than that of a pump driven thereby.

Briefly the automatic valve in accordance with the invention comprises a reciprocable valve movable between two limits by a small hydraulic motor, and blocking fluid flow in one limit position. The motor is moved through its range at a speed proportional to the rate of fluid flow through the line in which the valve is inserted, but preferably slower in the closing direction of the valve than in the opening direction. This is accomplished by directing the entire flow through the valve motor during movement of the valve in the opening direction, and by limiting the flow through the motor to a definite fraction of the total flow during closing movement of the valve. Limitation of the flow from a fraction of the total flow is obtained in accordance with the invention by means of two hydraulic fluid-metering motors connected in series in the line, the two motors being of slightly different displacement, and the differential flow being applied to the motor that moves the valve.

A full understanding of the invention may be had from the following detailed description with reference to the drawing, in which the single figure is a schematic diagram showing a preferred embodiment of the invention.

Referring to the drawing, a valve 10 in accordance with the invention is shown connected by lines 11 and 11a between one end of a hydraulic motor cylinder 12, and the usual 4-way control or selector valve 13, which is manually operated to cause the piston 12a of the motor cylinder to move in either direction. The other end of the motor cylinder 12 is connected by a line 14 to the 4-way valve 13, and the latter is connected by a supply line 15 to a pump 16, and by an exhaust line 17 to a reservoir 45. As is well known, the 4-way valve 13 may be moved between a position in which both the lines 11a and 14 are blocked, to maintain the motor piston 12a stationary, into a position in which the pressure line 15 is connected to the line 11a, and the exhaust line 17 is connected to the line 14, for moving the piston 12a to the right, or into another position in which the pump line 15 is connected to the line 14, and the exhaust line 17 is connected to the line 11a, for moving the motor piston 12a to the left.

There are many applications in which it is desirable to automatically limit the stroke of the motor piston 12a. The valve 10 is provided for this purpose in the system disclosed, and it functions to block flow between the line 11 and the line 11a during leftward movement of the piston 12a, to stop the latter after a predetermined quantity of fluid has flowed from the left end of the motor cylinder 12, through the line 11 and the valve 10.

The valve 10 has only two external ports, namely a first port 18 connected to line 11 leading from the cylinder 12, and a second port 19 connected to the line 11a leading to the selector valve 13.

The second port 19 is connected by a passage 20 to one side of a gear motor 21, the other side of which is connected by a passage 22 to one side of a second gear motor 34, and to one end of a branch passage 22a extending to the left end of a motor cylinder 23. The right end of this motor cylinder constitutes a valve seat 24 cooperating with a poppet valve 25 that is connected by a rod 26 to a piston 27 movable in the cylinder 23. The cylinder 23 is communicated at its right end, by the valve seat 24, with a chamber 28 that is connected by a passage 18a to the first port 18. An adjustable stop rod 29 for limiting the rightward movement of the poppet 25 is threaded through the wall of the body and is provided with a handle 30 at its outer end. A sealing piston 31 on the rod 29 prevents leakage of fluid therepast. A helical compression spring 32 may be provided between the seal 31 and the poppet 25 to urge the poppet and the piston 27 to the left, but this is not always essential.

As previously indicated, one side of the gear motor 34 is connected to the passage 22 and the branch passage 22a. The other side of this motor 34 is connected by a passage 35 to the right end of the cylinder 23. The gear motor 34 is shown as comprising two gears 34a and 34b respectively, and the gear 34a is coupled by a shaft 36 to one of the gears 21a of the gear motor 21 so that the two motors are at all times forced to run in unison.

The gear motor 34 is by-passed by a passage 37 containing a check valve 38 for permitting flow past the gear motor 34 from the second port 19 while preventing reverse flow. A passage 39 containing a check and relief valve 40 extends from the second port 19 to the passage 35 for permitting fluid flow from the second port 19 past the valve 25 to the first port 18, to by-pass the gear motors when the pressure in the port 19 is sufficiently great to overcome the spring of the relief valve 40. This spring is so proportioned as to permit the relief valve to open at a pressure less than that required to drive the gear motors. On the other hand, the check valve 38 is provided with a very light spring and functions merely to prevent reverse flow.

*Operation.*—The device is shown in position in which the motor piston 12a has been stopped during leftward movement by closure of the poppet 25 against the seat 24, thereby blocking the line 11. When it is desired to move the motor piston 12a to the right, the 4-way selector valve 13 is manipulated to connect the pump outlet line 15 to the line 11a, and connect the exhaust line 17 to the line 14. Pressure fluid thereupon enters the second port 19 of the valve 10 and flows through the passage 37, past the check valve 38, into the left end of the cylinder 23, moving the piston 27 therein to the right in so doing, and moving the poppet 25 in opening direction until the latter abuts against the stop rod 29. During this initial phase of the operation, fluid does not flow through the gear motor 34 or through the gear motor 21, because the resistance to movement of those motors is greater than the resistance afforded by the check valve 38 and the piston 27. Likewise, it does not flow through the passage 39 because the resistance of the check valve 40 is sufficient to prevent such flow. However, after movement of the piston 27 has been terminated by contacting the stop 29, the flow of fluid through the passage 37, and the passage 22a into the cylinder 23 is blocked, and the pressure then rises to a value sufficient to open the check and relief valve 40 and permit the fluid to flow through the passage 35 and through the open valve seat 24 into the chamber 28 and through the first port 18 to the left end of the motor cylinder 12, moving the piston 12a therein to the right. This movement continues until either the piston 12a reaches the right end of its stroke, or until the selector valve is restored to neutral position. In most instances the motion is continued until the piston 12a reaches the right end of its stroke.

When next the selector valve 13 is manipulated to supply pressure fluid to the line 14 and connect the line 11a to exhaust, the fluid flows through the line 14 into the right end of the cylinder 12, moving the piston 12a therein to the left, and exhausting fluid through the line 11 into the first port 18 of the valve 10. The fluid flows through the passage 18a and the chamber 28, valve seat 24, and through the passage 35. The fluid is blocked from flowing through the passage 39 by the relief check valve 40, so that it must flow through the gear motor 34 and thence through the passage 22 and the gear motor 21 and the passage 20 to the second port 19 and the back to the selector valve 13.

The gear motor 21 is designed to have a slightly larger displacement than the gear motor 34, and since the two motors are positively coupled together by the shaft 36 to rotate in unison, the motor 21 will always displace more fluid than the motor 34. It is apparent therefore that the gear motor 21 displaces fluid from the passage 22 more rapidly than it is being supplied thereto by the gear motor 34. The differential displacement fluid is supplied through the passage 22a from the left end of the cylinder 23 to permit movement of the piston 27 to the left. During this time, pressure of the fluid entering the first port 18 is applied through the cylinder 23 to the right end of the piston 27, urging the latter to the left, and it moves leftward as fast as the fluid in the left end of the cylinder 23 is exhausted therefrom by the differential displacement between the gear motors 21 and 34. When the motor piston 12a has traveled a predetermined distance to the left, the poppet 25 closes against the seat 24, positively blocking any further flow of fluid through the line 11, and stopping the motor piston 12a in a position determined by the amount of fluid that is required to move the poppet 25 from its rightmost position against the stop 29 into its leftmost position against the seat 24. This completes a cycle of operation.

The differential displacement of the two motors 21 and 34 can be very small. Hence the amount of fluid displaced by the piston 27 can also be very small, and can be a very small fraction of the total volume of fluid flowing through the motors 21 and 34. This makes it possible for the cylinder 23 and the piston 27 to be relatively small and compact.

When the pressure fluid is supplied to the pressure port 19 to move the piston 12a to the right, all of the fluid initially flows past the check valve 38 into the left end of the cylinder 23, thereby filling this cylinder very rapidly and moving the piston 27 through its full stroke into contact with the stop 29 before the motor piston 12a has traveled any appreciable distance. This insures positive resetting of the valve 25 against the stop 29 on each operation. Furthermore, it permits the operator, if he so desires, to move the motor piston 12a a further distance to the left by the following procedure. He first admits pressure fluid into the line 11 just long enough to restore the piston 27 into the rightmost position (which operation moves the motor piston 12a hardly at all), and then immediately reverses the valve 13 to again supply pressure fluid to the line 14. The motor piston 12a then moves a further distance to the left equal to its normal movement from the right end of its stroke, because the movement of the piston 27 will again meter the normal amount of fluid.

Obviously, the position in which the piston 12a is normally stopped may be varied between wide limits by adjusting the stop 29.

As has been previously indicated, the spring 32 urging the piston 27 to the left, is not always necessary. Ordinarily, the resistance to rotation of the motors 21 and 34 will develop sufficient pressure in the cylinder 23 to insure movement of the piston 27 to the left as fast as fluid is pumped from the left end of the cylinder by the differential displacement of the two gear motors. However, by providing additional force on the piston 27, as by means of the spring 32, its operation can be made more positive, particularly if the frictional resistance to movement of the piston 27 in the cylinder 23 is unusually large. In this connection, it should be borne in mind that the cross-sectional area of the piston 27 is usually very small, and the force thereon resulting from pressure of fluid in the cylinder 23 may be small compared to the frictional resistance to movement.

Although for the purpose of explaining the invention, a particular embodiment thereof has been shown and described, obvious modifications will occur to a person skilled in the art, and I do not desire to be limited to the exact details shown and described.

I claim:

1. A device of the type described comprising: a motor-actuated valve; a reversible hydraulic valve motor driving said valve for closing the valve in one end position of said motor, and opening the valve in other positions of said motor; a first fluid-metering hydraulic motor; a second fluid-metering hydraulic motor, and means mechanically coupling said two metering motors together for movement in unison; means defining first and second line ports, and passage means interconnecting said valve and said metering motors in series relation between said first and second line ports; said metering motors having different displacements; and means connecting said valve motor in shunt to the metering motor of lesser displacement; said valve motor being so poled relative to the polarity of the differential flow of said metering motors that the valve motor is driven in valve-closing direction by the differential fluid flow of said metering motors in response to flow from said first port to said second port.

2. A device according to claim 1 including auxiliary passage means connecting said valve motor between said ports independently of said metering motors, and check valve means in said auxiliary passage means blocking flow therethrough from said first port to said second port.

3. A device according to claim 2 having a second auxiliary passage by-passing said metering motors, and a relief and check valve therein for blocking flow therethrough from said first port to said second port, and offering more resistance to flow from said second port to said first port than said valve motor, and less resistance than said metering motors.

CARLOS B. LIVERS.

No references cited.